July 9, 1940. P. S. SMITH 2,207,419
APPARATUS FOR PHOTOGRAPHIC IMAGE PRODUCTION
Filed Sept. 6, 1939 6 Sheets-Sheet 1

INVENTOR
PHILIP STANLEY SMITH
BY
William T. Kreisner
ATTORNEY

July 9, 1940.  P. S. SMITH  2,207,419
APPARATUS FOR PHOTOGRAPHIC IMAGE PRODUCTION
Filed Sept. 6, 1939  6 Sheets-Sheet 2

INVENTOR
PHILIP STANLEY SMITH
BY William T. Kriesmer
ATTORNEY

July 9, 1940.   P. S. SMITH   2,207,419
APPARATUS FOR PHOTOGRAPHIC IMAGE PRODUCTION
Filed Sept. 6, 1939   6 Sheets-Sheet 3

Fig. 8.

INVENTOR
PHILIP STANLEY SMITH
BY William T. Kriesner
ATTORNEY

Patented July 9, 1940

2,207,419

UNITED STATES PATENT OFFICE 2,207,419

APPARATUS FOR PHOTOGRAPHIC IMAGE PRODUCTION

Philip Stanley Smith, Camden, N. J.

Application September 6, 1939, Serial No. 293,537

20 Claims. (Cl. 88—16.6)

This invention relates to photographic production and apparatus for photographic image production.

This application is a continuation in part of my application Serial No. 90,118, filed July 11, 1936 now Patent 2,176,108.

In United States Letters Patent Nos. 1,927,925 and 2,025,731 of Ludwig M. Dieterich, are described methods and apparatus for producing photographic pictures having the effect of relief or depth; one of the objects of this invention is to provide a method and apparatus of the just mentioned character that will have a superior range of change or variation in effect, that will be widely flexible of control to facilitate meeting widely varying conditions met with in practice, and that may be controlled and operated in a simple and dependable manner. Another object is to provide for greater ease and speed of control, particularly where, when image-recording or reproduction is being made of a changing scene, as in motion picture photography, and to make possible successive predeterminations of the factors affecting the operation of the apparatus in advance respectively of successive changes in conditions of the same scene or changes in the scene.

Another object is to improve upon the method and apparatus of the aforesaid Dieterich patents in a manner to make the same more readily and more widely adaptable to the widely varying requirements of motion picture photography and also in a manner to achieve a greater variety of effects. Another object is in general to improve and to extend the methods and apparatus of the aforesaid Dieterich patents. Other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawings in which are shown by way of illustration several of the various possible embodiments of the mechanical and electrical features of my invention.

Similar reference characters refer to similar parts throughout the several views of the drawings.

Certain features of my invention are best illustrated when embodied for motion picture photography and in the following description the reference to the latter is to be interpreted as illustrative for my invention contemplates and includes still photography as well as, generally, the production of images of any scene, object, or the like. In Figures 1-4 is shown a motion picture camera having a casing 30 transversely slidable on the base 31 in suitable ways 32, 33, base 31 having any suitable support 34. Casing 30 has suitable film reels or holders 35, 36 for the film 37, the latter being in the usual strip form and being fed through any suitable film-driving mechanisms (not shown) including the usual shuttle mechanism, shutter, or the like, of any suitable form, as, for example, in Dieterich Patent 2,025,731. Casing 30 has any suitable source of driving power for these film mechanisms, such as an electric motor 38 connected in any suitable way to drive the main shaft.

Figure 5:
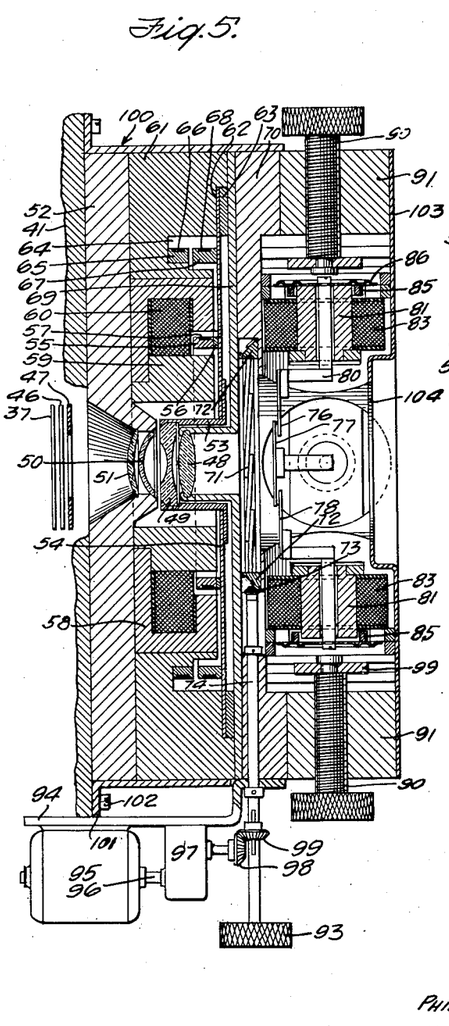
Figure 5 is a central vertical sectional view, with certain parts broken away or omitted, and on an enlarged scale, substantially as seen along the line 5—5 of Figure 1 or the line 5—5 of Figure 3, showing an illustrative form of lens mounting, diaphragm, and iris diaphragm, and actuating mechanism therefor.

Base 31 (see Figures 1 and 2) has an upright hollow standard 39 with respect to which casing 30 is likewise slidable, and upon the front of the standard 39 is rotatably mounted, by stud shaft 40, a disk or plate 41 which carries a number of lenses or lens systems, illustratively four, as at 42, 43, 44, 45, any one of which may thus be positioned relative to the aperture, shutter and film of the camera. These lens systems may be of any desirable or suitable construction and at least one of them, illustratively lens system 42, embodies certain features of my invention, and hence, in Figure 5, it is the lens system 42 that is shown, positioned by rotary plate 41 for having the film 37 exposed therethrough, camera casing 30 being for that purpose shifted into the position of Figure 1. In Figure 5 there is indicated diagrammatically the shutter 46 coacting with an aperture plate 47 to control the exposure of the film 37.

The lens system 42, according to certain features of my invention, preferably comprises any lens system constructed according to the above-mentioned Dieterich patents; thus, it may comprise a lens system of the type shown in Figures 2, 3 and 4 of Patent 1,927,925 in which relative movement between three lenses takes place or, as illustrated in the drawings, it may comprise the form described in that patent with respect to Figures 9, 10, 11 and 12 or the form described in Patent 2,025,731 where relative lens movement is achieved by moving one lens relative to the rest, all for the purpose, as described in the Dieterich patents, to achieve upon the receptive element or film an infinite number of images of the scene or object, each, however, corresponding to a different focus or plane of sharpness and all of the recorded images being of the same size and registering throughout, thereby giving the recorded effect of relief or depth in the scene or object.

Thus, in Figure 5, lenses 48, 49, 50 and 51 may correspond respectively, in construction and action, to lenses 26, 27, 28 and 29 of Figures 2 and 5 of Patent 2,025,731, or to lenses 226, 227, 228 and 229 of Figure 9 thereof, or to lenses 4, 3, 2 and 1 of Figures 9–12 of Patent 1,927,925.

Lenses 50, 51 are mounted in an aperture in a disk-like plate 52 which rests against and is secured to the rotatable mounting plate 41 of the camera.

Movable lens 49 is carried in a sleeve 53 secured in the aperture of a sheet-like flexible or resilient preferably metallic disk-like support 54 which has a ring-shaped armature 55 secured thereto through a non-magnetic spacer 56, armature 55 having a winding 57 thereon, being spaced in the annular air gap between the two-part annular field core structure 58—59, shaped, as shown, to receive the annular winding 60. The core structure 58—59 is carried in a ring member 61 preferably non-magnetic and secured to lens plate 52 and having an annular recess 62 in which is seated the peripheral portion of the spring support 54 which is clamped therein by a clamping ring 63 secured to ring 61 in any suitable way.

Ring 61 is cut out as at 64 to form a seat for a ring armature 65 secured thereto and carrying a winding 66 and to provide a space to accommodate a companion ring armature 67 having thereon a winding 68, core 67 being secured to the spring diaphragm-like lens support 54.

Lens 48 is suitably secured in a sleeve-like mounting carried by or suitably secured to a disk supporting member 69 that overlies the ring members 61 and 63 and is suitably clamped thereagainst. All of these lens supports and mountings are so shaped and assembled and secured together, as by clamping screws, that the optical axes of the individual lenses are coincident and hence coincide with the optical axis of the lens system. The flexible disk support 54 of the movable lens 49 yields for effecting movement of the lens but without tilting of the latter so that the optical axis of the movable lens is always in coincidence with the optical axis of the lens system, throughout its range of movement.

Fitted and secured against part 69 is a ring member 70 and in its aperture is mounted a variable iris diaphragm 71 of any suitable construction to permit adjustment of the aperture and adjustable in any suitable manner as, for example, by a ring gear 72, the rotary position of which, and hence the size of the aperture formed by the iris diaphragm, may be set as by a bevel gear 73 on the end of a shaft 74 rotatably mounted in the ring 70.

Figure 8:
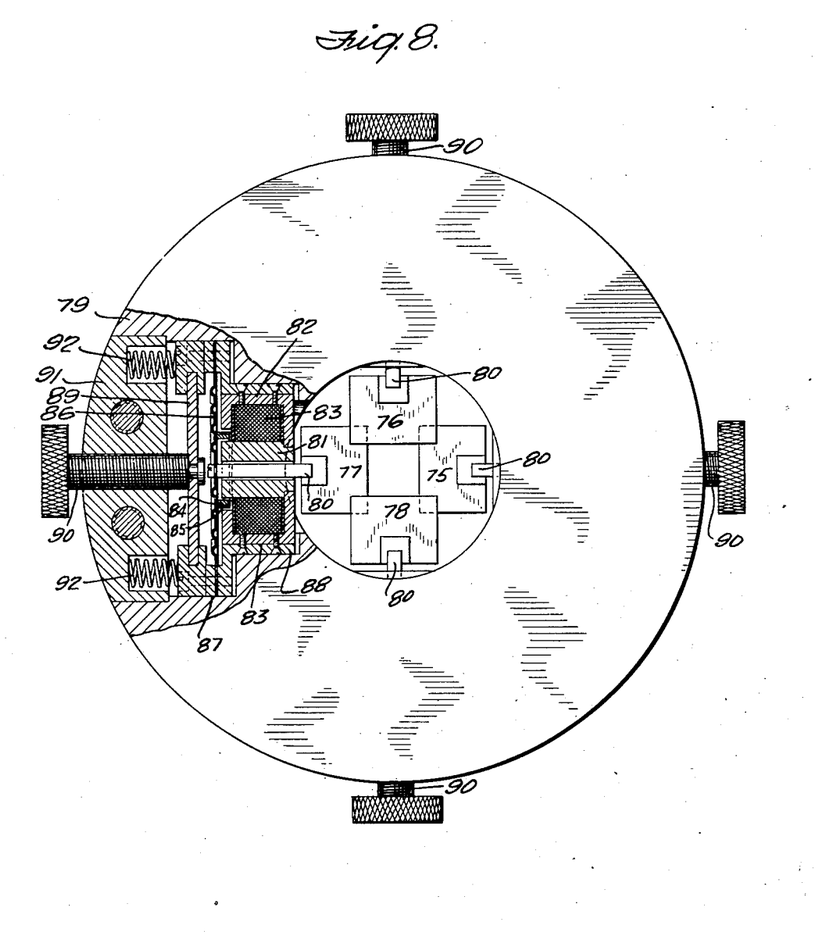
Figure 8 is an end elevation as seen from the left in Figure 5, certain parts being, however, shown in section.

Also alined along the optical axis and positionable either in front or in rear of the iris diaphragm 71, illustratively in front thereof, is a mechanism for varying the amount of light with change in focus where that action as taught in the said Dieterich patent is desired, and preferably this variable diaphragm comprises four plate members 75, 76, 77, 78 (see also Figure 8) preferably arranged in opposed pairs and presenting suitably shaped aperture-outlining edges, illustratively square. These plate members and their actuating means are carried in a frame ring 79 and they are identical in construction, the four units being spaced 90° apart in the frame ring 71.

Figure 6:
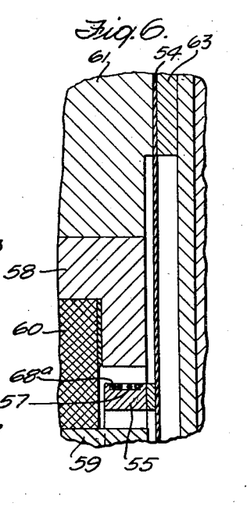
Figures 6 and 7 are views like that of Figure 5 but only fragmentary, showing certain alternative forms of lens actuating or control means.
Figure 7:
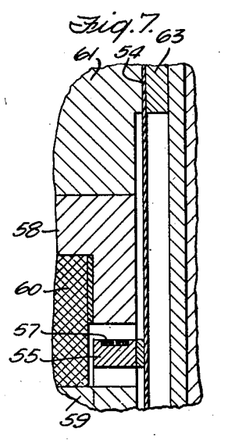

Thus, each plate is carried at one end of an L-shaped link 80 that extends through the cylindrical core part 81 which with its companion annular core part 82 encases a winding 83, core parts 81 and 82 providing an annular air gap into which extends a ring armature 84 having thereon a winding 85, armature 84 being secured to a flexible resilient sheet metal disk 86 at whose center the link 80 is secured while its peripheral portions are clamped between the annular frame parts 87 and 88. Frame part 88 has the core structure 81—82 secured thereto (see Figure 8), while frame part 87 has secured thereto a rigid yoke 89 at whose center is rotatably secured the inner end of an adjusting screw 90 that is threaded into a segment 91 that closes the recess or cut away parts of the frame ring 79 in which the unit 80—81—83—82—88—87—89 is slidably mounted for movement along a radius and hence toward or away from the optical axis, springs 92 being interposed between the yoke 89 and the closure part 91 to take up lost motion or back lash. As shown in Figure 6 the frame ring 70 that carries the iris diaphragm 71 may be constructed to take part in the mounting of the four units of the just described character; frame rings 79 and 70 may be secured together as by screws.

Preferably the shaft 74 (Figure 5) for adjusting the iris diaphragm 71 is adjustable both manually and by suitable electromagnetic means. Thus, it may have a knurled adjusting knob 93 on its outer end while a bracket 94, secured to the frame ring 70, carries a suitably constructed servo-motor 95, preferably of the type in which its rotary element will assume any position throughout a possible 360° rotary movement, or fraction thereof, according to the degree of energization of the motor, the shaft 96 of the motor being connected to drive the shaft 74 through a gear box 97 and the bevel gears 98 and 99; the gear ratios are preferably so selected that the range of rotary movement of the servo-motor 95 is sufficient to change the opening made by the leaves of the iris diaphragm 71 from zero to a maximum. If desired, the servo-motor drive may be disconnectable, as, for example, by splining the gevel gear 99 to the shaft 74 to permit shifting it manually out of engagement with the driving gear 98, thus to leave the iris diaphragm only manually controlled.

The various annular or ring-like frame members (Figure 5) may be suitably, in whole or in part, encased in a suitable casing 100 which may take part in mounting the assemblage on the rotatable front plate 41, as by the flange 101 of the casing and screws 102. The right-hand end of the assemblage may be closed off or finished off as by a disk-like plate 103 (Figure 5) which may be secured in any desired way to the frame ring 79 and which has a central aperture 104 preferably circular and with its axis coincident with the axis of the lens system, the aperture being of appropriate size or diameter to pass therethrough sufficient light from the scene or object for appropriate action or control by the various above-described movable parts.

Figure 1:
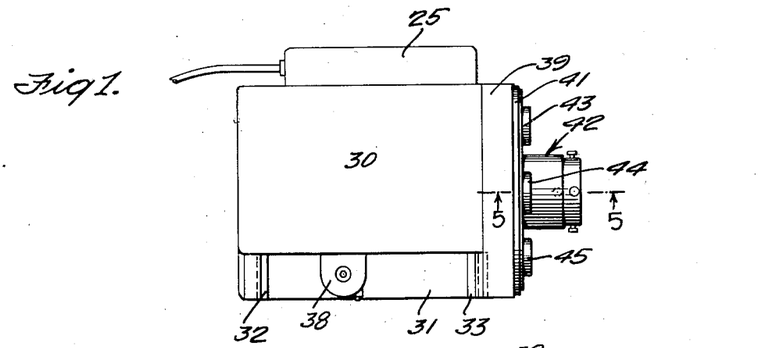
Figure 1 is a plan view on a small scale of a camera, illustratively a motion picture camera.
Figure 2:
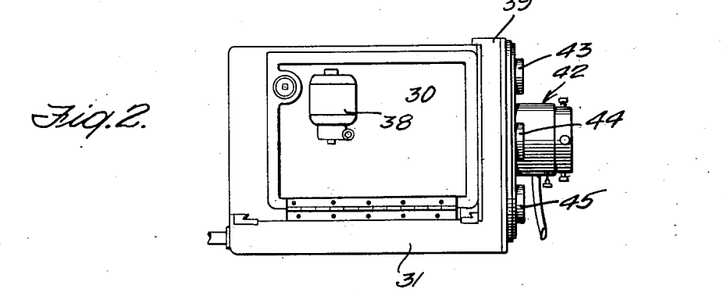
Figure 2 is a side elevation thereof.
Figures 3, 4:
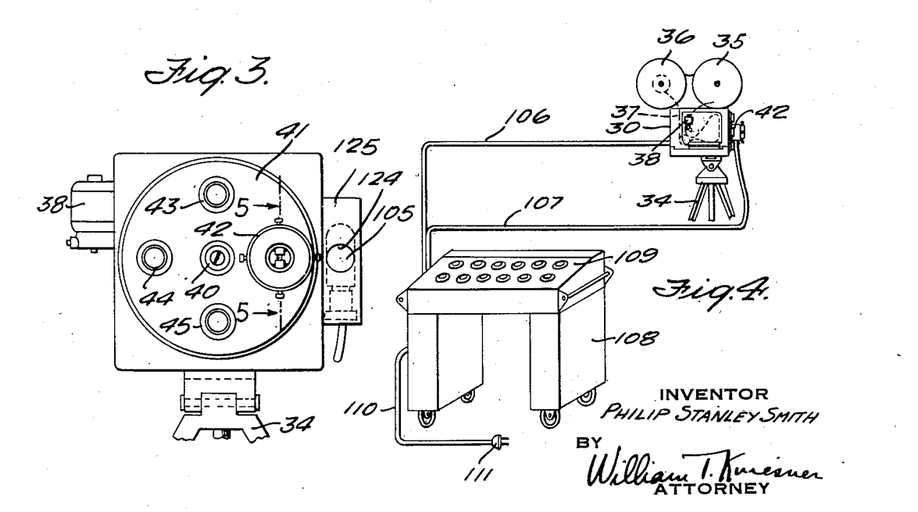
Figure 3 is an end elevation as seen from the right in Figure 1.
Figure 4 is a perspective view on a still smaller scale of such a motion picture camera illustrating also the manner in which certain of the control apparatus may be associated therewith.
Figure 9:
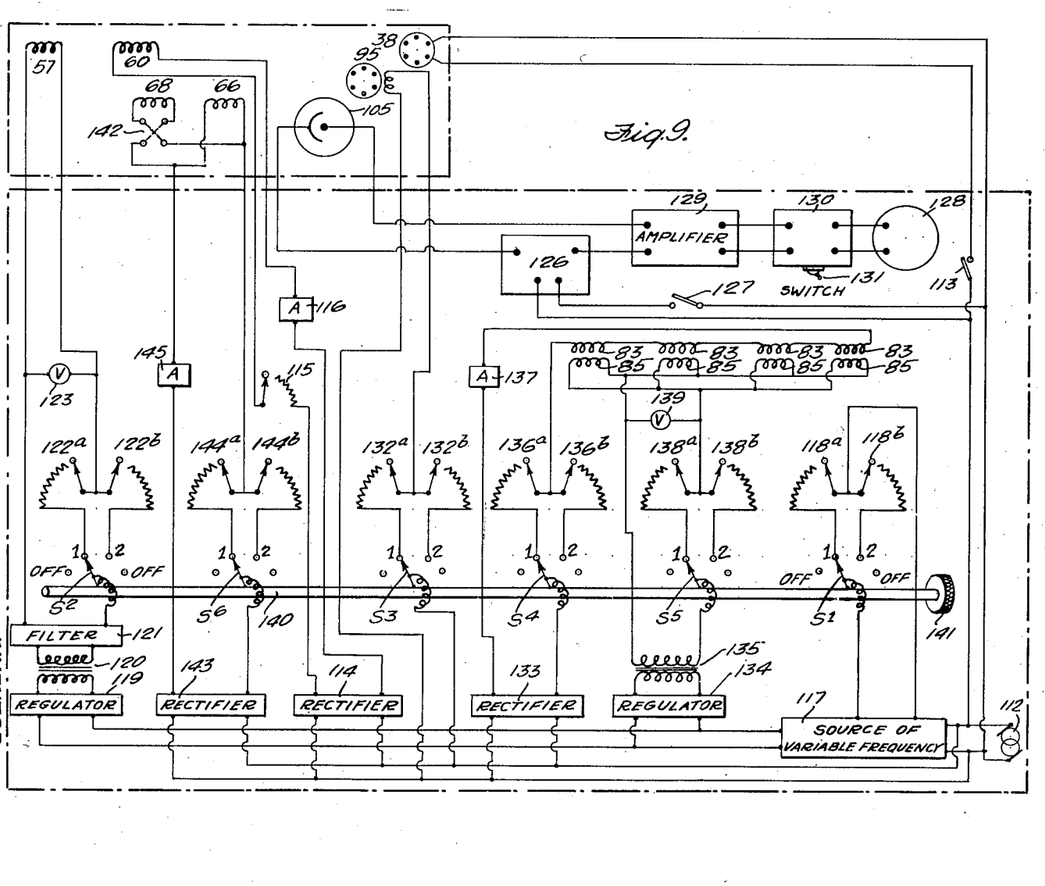
Figures 9, 10 and 11 are electrical diagrams of circuit arrangements and electrical systems for achieving certain controlling and testing actions and operations.

In Figure 9 is shown diagrammatically a circuit arrangement and control, and of the electrical parts above described, the coils affecting the relative lens movement are indicated at 57, 60, 66 and 68, the servo-motor at 95, the camera motor at 38, and the four pairs of diaphragm plate moving coils are shown at 83—85; these parts, and a photoelectric cell 105 related to the camera as later hereinafter described, are all associated as above described, with the camera mechanism shown in Figures 1, 2 and 3, and suitable conductors, which may be formed into several cables, as shown at 106 and 107, in Figure 4, extend their circuits to a portable cabinet 108 having an instrument or control panel 109; in the cabinet are housed the various electrical apparatuses about to be described while the various indicating instruments and manual controls about to be described are conveniently grouped for easy visibility and easy manual control in the face of the panel 109, as is diagrammatically indicated in Figure 4. A cable 110 leads from the cabinet 108 and has a connecting plug 111 which may be plugged into any plug receptacle associated with a suitable power circuit, such as a commercially available 60-cycle 110-volt alternating current circuit, the latter being for convenience diagrammatically indicated in Figure 9 at 112.

From Figure 9 will be seen a circuit leading from the driving motor 38 to the power circuit, through a suitable control, such as a switch 113.

Winding 60 I preferably energize by unidirectional or direct current to set up a magnetic field or flux in the air gap (Figure 6) in which is contained the winding 57 and armature 55, and winding 57 I energize with periodically varying current, such as alternating current, to produce a magnetic field or flux which, like the current producing it, is also periodically variable and in the illustration is alternating. The resultant reaction between these magnetic fields is to cause an oscillation of the armature 55 and winding 57 at the frequency of the variation in the current energizing winding 57; such oscillation is permitted by the flexibility or yieldability of the diaphragm 54 which carries the movable lens 49, and hence the latter is likewise oscillated along the optical axis of the lens system and with its own optical axis always coincident therewith.

The unidirectional current for energizing winding 60 I preferably derive by the use of a rectifier 114 interposed between the winding 60 and the alternating current source 112, and in the direct current circuit of the winding I interpose a rheostat 115 and an indicating instrument, such as an ammeter 116 to indicate the degree of energization of winding 60 as determined by the rheostat 115.

Since, as will later appear, the frequency of the current energizing the winding 57 is preferably variable, I provide, as diagrammatically indicated at 117 a suitable means, energized from the source 112, for providing a frequency which may be varied or changed at will; this means may comprise any suitable arrangement such as, for example, a motor driven alternator, the speed of drive and hence the frequency of output of which may be varied or changed, or and preferably a so-called "oscillator" made up of a suitable electronic conduction tube or tubes with appropriate circuits, preferably variable and preferably including an amplifier, in any suitable or well-known form, to produce alternating potential or current of selectable frequency. Whatever the form of the device 117, suitable means for changing its frequency are provided, illustratively in the form of a variable resistance or rheostat of which, in Figure 9, two are shown at 118$^a$ and 118$^b$ either of which may be put into effective circuit control by a selector switch S$^1$, for a preferred purpose later described.

From the frequency changer 117, a circuit extends through a suitable voltage regulator 119 to a transformer 120, preferably to reduce the voltage, and the output of transformer 120 is passed through a filter 121 to the winding 57 by way of either of two rheostats 122$^a$ and 122$^b$ selectably putting in controlling circuit relation by a selector switch S$^2$. An indicating instrument preferably in the form of a voltmeter 123 indicates the energization of winding 57 as determined by the rheostat.

Lens 49 may thus be vibrated or oscillated at the frequency of the alternating current energizing the armature winding 57; its movement is, of course, relative to the stationary lenses 48, 50 and 51 and if its oscillation is within the limits of a certain range of possible movement relative to the remaining lenses, all as described in the aforesaid Dieterich patents, the plane of sharpness or focus is shifted back and forth from a point near the lens to a point far removed from the lens, if the entire certain range of movement is used, while at the same time in-focus and out-of-focus images are maintained at the same size and in registry. To aid in calibrating the various control and indicating instrument particularly with respect to the limits of the maximum range of possible relative movement, I prefer to employ the above-mentioned photoelectric cell 105 which is suitably mounted (see Figures 1 and 3) at the side of the movable casing 30 so that the axis of the aperture 124 of the cell casing 125 is in line with the optical axis of the lens system and the light sensitive element of the cell 105 is at the image plane, after appropriately shifting casing 30.

The cell 105 has its electrodes included in a circuit in which is included a suitable source of potential 126 (Figure 9) which is preferably derived, under the control of a switch 127 from the principal or primary source 112; the source 126 may comprise any suitable device, well known in the art, for providing a suitable potential in the circuit of the photoelectric tube 105. In the output circuit of the photo-cell 105 is included a suitable measuring or indicating device 128 that is preferably of a sensitive and precision type, such as a vacuum tube type of A. C. voltmeter, for indicating current flow in the circuit of the photo-cell and also variations in such flow; this indicating means 128 may, if desired, include an amplifier 129 and preferably also an electrical filter 130.

To utilize the photo-cell 105 and its circuit to determine the proper range of relative lens movement and to calibrate various instruments or controls, switches $S^1$, $S^2$ are appropriately set, as, for example, to position "1" and rheostats 122a, 115 and 118a move from their "off" positions into circuit-controlling position. Rheostat 118a may be set for any desired frequency while the setting of rheostats 122a and 115 achieve energization of windings 57 and 60, setting movable lens 49 (Figure 6) into oscillation; the iris diaphragm 71 may be manually set by control 93 and the diaphragm plates 75, 76, 77 and 78 manually set by the unit-adjusting screws 90 (Figure 8) to determine the desired mean or average value of light to pass through the now active lens system to the image plane at which, however, is now the light-sensitive element of photo-cell 105.

Rheostat 115 is now set to a value as indicated by the ammeter 116 either in current intensity or other indication for which the instrument may be calibrated, to cause the winding 60 (Figure 5) to set up the desired value of unidirectional flux in its annular air gap in which is winding 57 whose alternating current energization may now be set or controlled by rheostat 122a, the voltage being indicated by the voltmeter 123 which may also be otherwise calibrated. Initial closure of rheostat 122a starts the lens 49 vibrating to each side of its normal neutral or mid position and as the energization of winding 57 is increased the amplitude of oscillation increases, and with these effects indicator 128 in the photo-cell circuit gives an increasing indication, the setting for rheostat 122a corresponding to the proper and complete range of relative lens movement being that at which the indicator 128 gives a maximum indication. Thereby, I make certain that the movable lens in the lens system does not over-step its limited range of movement within which in-focus and out-of-focus images are equal in size and also register at the image plane.

If the amplitude or distance of travel of the movable lens is outside the above-mentioned critical range relative to the remaining lenses, the images produced upon the photo-cell element will in effect be blurred in that out-of-focus images do not register concentrically with in-focus images and thus the effective light transmitted to the photo-cell is in quality or quantity different from the light which would reach it if the in-focus and out-of-focus images were of the same size and in registry. Accordingly, improper relative movement between the lenses causes the indicator 128 to give an indication, registering a fluctuating light-density, in terms of alternating current, due to the periodic movement or oscillation of the movable lens at the frequency of the alternating current selected by control 118a.

During these testing operations filter 130 is switched into its circuit by its switch 131. Interference with the testing system by foreign or outside fluctuations is negatived by the action of regulator 119, preferably of the core-saturation type, which negatives possible fluctuations in the source 112, and by filter 121 which is adjusted to suppress all frequencies other than that selected by the control 118a, that being the frequency of lens oscillation. Filter 130, connected in parallel by its switch 131 in the amplifier output circuit, is proportioned or adjusted to suppress all frequencies other than the frequency selected by control 118a and hence the frequency of lens relative movement, thus suppressing variations in normal light reaching the image plane and corresponding to the "noise level" or frequency of the normal light. Thus, I make sure that indicator 128 gives a true indication of the light action of the lens system.

Next, the light-controlling diaphragm plates 75, 76, 77, 78, having already been approximately set by the adjusting screws 90, may now be precisely set by the screws in relation to a more precise setting, if necessary, by control 93 of the iris diaphragm. The oscillation of the movable lens 49 is now halted, as by setting rheostat 122a or rheostat 115 to its "off" position, and the effects of these settings of the plates and iris diaphragm gaged with reference to their respective effects upon the photo-cell and its circuit; firstly, the iris diaphragm is set to make sure that sufficient light falls upon the image plane, as is necessary to photograph the most distant objects in the scene, and here again the indicator 128 may be appropriately calibrated in terms of suitable factors, such as distance from the camera.

Preferably, the just described settings of the iris diaphragm are achieved by control of the servo-motor 95 whose circuit, as shown in Figure 9, extends to the source of alternating current 112 through a selector switch $S^3$ by which either of two rheostats 132a and 132b may be included selectively in the motor circuit. The settings of the iris diaphragm may thus be varied by either of these rheostats which may be likewise calibrated in suitable factors, such as distance from the camera.

Having thus achieved the desired setting of the iris diaphragm for the particular conditions to be met, the plates 75, 76, 77 and 78 are set into motion by energizing the field windings 83 thereof with direct current derived from the source 112 through a rectifier 133, and by energizing the armature windings 85, which are respectively in the magnetic fields of the windings 83, by alternating current energy of the desired frequency, derived from the frequency changer 117 through a regulator 134 and a suitable step-down transformer 135. The diaphragm plates are thus set into oscillation at the frequency selected by the control 118a.

The circuit of windings 83, preferably arranged serially, includes a selector switch $S^4$ by which either of two rheostats 136a, 136b may be injected into the circuit, and also an indicating instrument, such as an ammeter 137 which may be calibrated in other factors than current values; by whichever rheostat is put in circuit by the selector switch $S^4$, the energization of windings 83 is brought to a suitable value to cause each to produce the desired unidirectional magnetic field (Figures 6 and 8), while the amplitude of vibration or oscillation of the plates may be determined by either of two rheostats 138a or 138b selectively brought in circuit by a selector switch $S^5$, an instrument 139 in the form of a voltmeter but calibrated also in other factors indicating the energization of armature windings 85, the latter being connected in parallel.

For the given set of conditions theretofore established, the rheostats, such as 136a and 138a (with selector switches $S^4$ and $S^5$ in position "1")

are now manipulated one with respect to the other until the indicator 128 in the photo-cell circuit reaches a maximum indication, the latter corresponding to proper or optimum oscillation of the diaphragm plates at the selected frequency.

The movable lens may now be set into oscillation again by setting rheostats 115 and 122ª to the values previously determined by the photo-cell testing circuit, and now switch 131 of the filter 130 closed to bring the filter into the circuit to check the composite action of relative lens movement and diaphragm plate movement. If the indicator 128 now indicates a minimum, as determined by manipulating either or both of rheostats 136ª and 138ª, the system is in appropriate setting and ready for operation. Photographing of the scene or object may now be proceeded with.

The above procedure is set forth by way of indicating how any set of adjustments may be safely arrived at with the aid of the photo-cell test according to whatever are the conditions met with in the scene or object whose images are to be recorded. But preferably the photo-cell circuit is used to calibrate the various controls and indicating instruments in terms of light values, distances from the camera, frequency values, diaphragm movement, iris diaphragm adjustment, and the like, or, in so far as the control features of my invention are more broadly concerned, such calibrations may be achieved otherwise, for example, empirically. With all of the controls and indicating instruments thus calibrated, it being noted that selectable controls like pairs of rheostats are duplicates and are similarly calibrated, and with all of the calibrations and controls accessible in the panel 109 (Figure 4) of the control cabinet 108, it is now possible to achieve a quick adaptation of the system to any particular scene requirements.

For example, and noting first that the selector switches are suitably synchronized as by mounting them on a single control shaft diagrammatically indicated at 140 and operable by the switch-over control 141, also exposed in the panel 109, and with the construction preferably such that the selector switches have four positions, as shown, the two extreme positions being "off" positions, the control 141 is first set to put the selector switches on say position "1," whence controls 122ª, 132ª, 136ª, 138ª and 118ª are first properly set to the desired calibrated values, control 115 being preferably set once and for all and camera driving motor switch 113 being, of course, then closed, photographing of a scene or object may be proceeded with with entire assurance of proper functioning of the lens system and related parts. Should conditions in the scene change, some of these controls may be shifted or adjusted during the photographing while on the other hand should such changes in the scene or sequence being photographed take place as to require a more radical change in setting, controls 122ᵇ, 132ᵇ, 136ᵇ, 138ᵇ and 118ᵇ, or such of them as may be required, are given such different settings as may be needed, all while these controls are kept out of circuit due to the selector switches being in position "1." At the moment when the scene or sequence changes, the new settings are brought into effect by operating the switch-control 141 to set the selector switches on position "2," thus taking the former set of controls 122ª, 132ª, etc., out of circuit. The latter may now be manipulated as may be necessary to prepare for a subsequent shift or change in requirements and brought into effect by a subsequent shifting of the selector switches in synchronism to position "1."

Windings 66 and 68 are connected in parallel through a reversing switch 142 and are supplied with direct current energy derived from the source 112 through the rectifier 143, and by way of a circuit which includes another selector switch S⁶ by which either of two rheostats 144ª and 144ᵇ may be used to control the energization of these two windings, the extent of change is indicated by an ammeter 145 calibrated in suitable factors as will now be clear.

If windings 68 and 66 are energized, under control of reversing switch 142, which is also in the panel 109 (Figure 4), so as to magnetically oppose each other, the diaphragm spring mounting 54 (Figure 5) of the movable lens 49 is biased toward the right and hence movable lens 49 is made to assume a different normal or neutral position than it did theretofore. If switch 142 is reversed, the magnetic fields of these windings attract each other and the biasing is toward the left. The amount of biasing in either direction is determined by either of the rheostats 144ª, 144ᵇ.

During oscillation of the movable lens throughout its normal and maximum range, the focus of the lens system is changed from a point near the camera to a point infinitely remote from the camera, while lessening the energization of winding 57 as by setting rheostat 122ª or 122ᵇ is effective to shorten the stroke of oscillation while maintaining the same middle or neutral point as above, thus shifting the focus again throughout each stroke but now throughout a shorter range positioned intermediate of the point near the camera and the point infinitely remote from the camera. By causing the electro-magnets 66 and 68 to effect a controllable or variable bias, the neutral point to each side of which the lens oscillates is shifted toward one end or the other of the original or normal or maximum range of movement, according to whether these magnets oppose or attract, and thus any portion of the normal range of relative movement may be selected.

For example, scene or portions of scenes of small depth that require equal movements of the movable lens 49 to either side of its normal neutral position may be photographed as above described, leaving rheostats 144ª and 144ᵇ in open position, thus avoiding the biasing action, and utilizing rheostat 122ª or 122ᵇ to select the desired amount of these equal movements of the movable lens to either side of its normal neutral position, thus concentrating the action of the lens system in changing focus while maintaining size and registry of in-focus and out-of-focus images throughout a corresponding depth of scene between a point intermediate of nearness to and remoteness from the camera. The above-described calibrations of the instruments and controls facilitate the making of any such setting.

But when the lens action is to be concentrated throughout a depth of scene near the camera, switch 142 is given the desired position preferably simultaneously with the actuation of the switch-over control 141 after, of course, having set the appropriate rheostat 144ª or 144ᵇ to give the desired biasing for this depth of scene near the camera. For a depth of scene remote from the camera, the reversing switch 142 is actuated at the appropriate time to reverse the biasing effect and thus to select a different portion of the normal range of relative lens movement.

It will be noted that the various controls, such as the rheostats, are constructed each to have an "off" position; thus, for example, if it is desired to dispense with the diaphragm plate movement, rheostats 136a, 136b, 138a, 138b are simply set to the "off" position.

Figure 10:
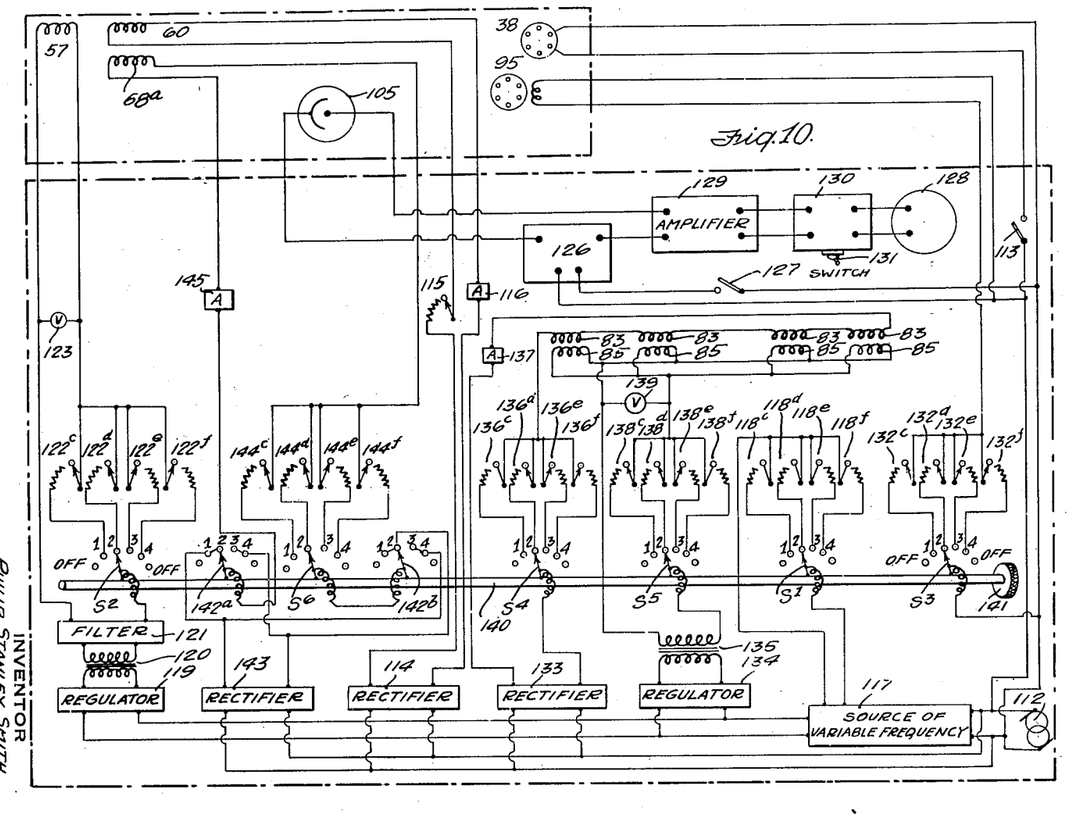

To obviate the need or desirability of manually operating the reversing switch 142 simultaneously with the switch-over control 141, I prefer to synchronize the operation of the two as by an arrangement shown in Figure 10 where the separate windings 66 and 68 are dispensed with and, as is shown in Figure 6, I employ a single winding 68a unidirectionally energized but mounted adjacent to the winding 57 and hence magnetically related also to the armature 55, and utilize the unidirectional magnetic field produced by winding 68a to coact, according to the direction of current flow through it, with the unidirectional field produced by the winding 60. In Figure 10 winding 68 is again energized from the rectifier 143 but through a circuit that includes two switch arms 142a, 142b mounted on the control shaft 140 to be moved thereby and synchronously with the selector switches S¹, S², S³, S⁴, S⁵, S⁶; in Figure 10 these switch arms and selector switches have six contact positions, as shown, but as to reversing switches 142a, 142b contacts "1" and "2" are electrically tied together as are also contacts "3" and "4."

Just as each position "1" and "2" of the selector switches of Figure 9 has in circuit with it a rheostat so also each position "1," "2," "3" and "4" of the corresponding and similarly numbered selector switches of Figure 10 has a rheostat in circuit therewith, resulting in flexibility of control and manipulation, as follows:

First, it will be noted that with the shift-over control 141 in either position "1" or "2," the circuit arrangement determined by reversing switches 142a, 142b is the same so that no change in direction of current flow takes place in shifting from position "1" to position "2;" a similar arrangement, but with the direction of current flow reversed, exists with respect to positions "3" and "4."

Accordingly, and assuming all of the selector switches S¹ to S⁶ to be in position "2," a given operating condition exists according to the setting of the controls 122d, 144d, 136d, 138d, 118d and 132d; reversing switches 142a, 142b are also in position "2" so that current flows through the biasing winding 68a in a corresponding direction, thereby selecting a range of relative lens movement that is toward one end of the entire or maximum range, to an extent determined by the adjustment of controls 144d and 122d, thus causing the lens system to bring into prominence or sharpness in image registration those parts of the scene corresponding to that selected portion of the available range of movement, illustratively near the camera.

With photographing proceeding with such a setting and assuming that the next sequence of the same scene or the next scene requires image registration corresponding to a change in the biasing action but without reversal of current flow, the controls 122e, 144c, 136c, 138c, 118c and 132c, or such of them as requirements dictate, are given new settings or adjustments and this may be done while the camera is operating so that, when the moment of change in scene requires bringing these new settings into effect is reached, the operator switches the switch-over control 141 to position "1," thus making effective the just-set controls.

Should a reversal in biasing action of coil 68a be required, the operator sets controls 122e, 144e, 136e, 138e, 118e and 132e, or such of them as requirements dictate, thus to set up the controls for the ensuing requirement. When the latter matures, switch-over control 141 is now switched to position "3," bringing these new settings or controls into effect, so that the new operating conditions for the new requirement are instantaneously present. Here it will be noted that in moving from position "1" to position "3," the reversing switches 142a, 142b become positioned to send the current from the rectifier 143 through the biasing winding 68a but in reversed direction, causing the movable lens to oscillate through a different portion of its normal range, now toward the other end, causing the lens system to bring into prominence or sharpness in image registration those parts of the scene corresponding to that selected portion of relative lens movement, illustratively remote from the camera.

On the other hand, if a biasing action is not needed, any one of the controls 144c, 144d, 144e, 144f, according to which one is to be made effective upon the subsequent setting of the selector switch S⁶, is set to its "off" or open circuit position, whence the oscillation of the movable lens proceeds throughout the entire range of relative movement or any smaller portion thereof but always with respect to the midpoint of its normal range, according to the setting of the corresponding rheostats in the circuits of windings 57 and 60.

Figure 11:
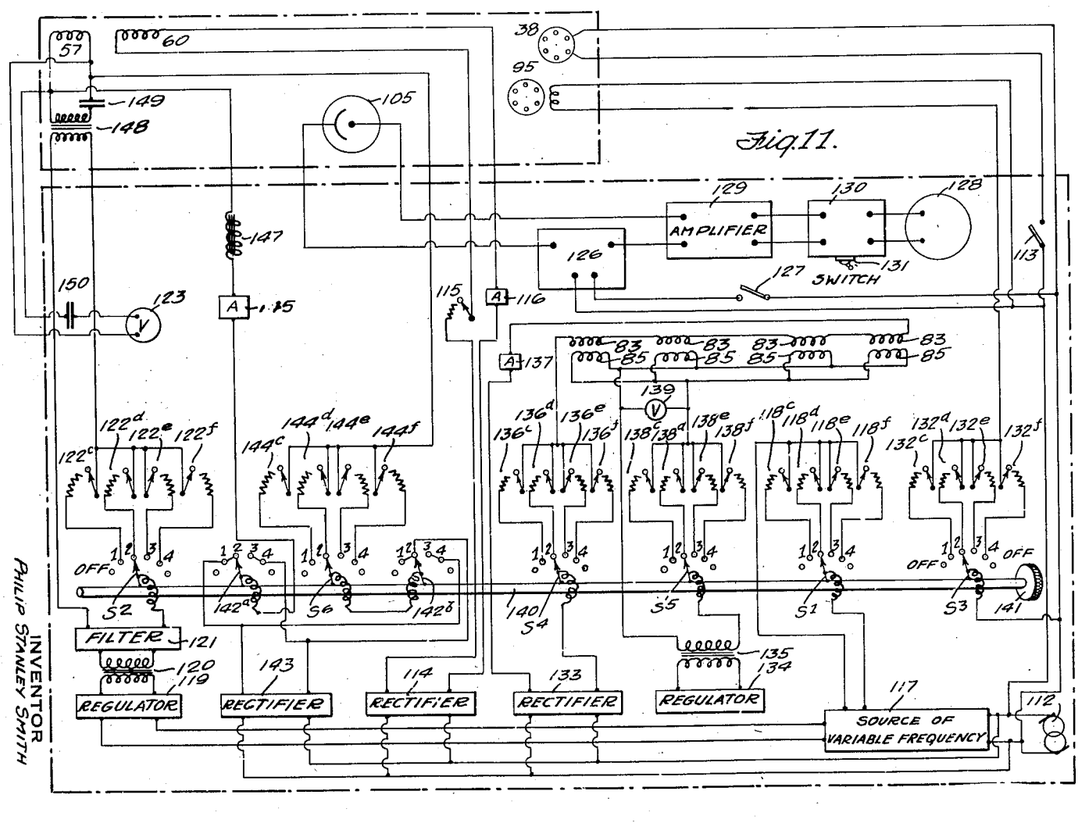

In Figure 11 I have shown a further simplification of the windings controlling any movable lens, such as the movable lens 49, in that I may dispense entirely with the biasing windings 66 and 68 and even also with the biasing winding 68a of Figure 10 and utilize only windings 60 and 57. Thus, in Figure 11, I have arranged winding 57 to be energized not only by alternating current but also by a reversible unidirectional current so that the reversible unidirectional flux of the latter current may coact with the unidirectional flux of the winding 60 to achieve the above-described biasing action, preferably by way of a control, as already above described and as shown in Figure 11.

The circuit arrangement of Figure 11 is exactly like that of Figure 10 excepting that winding 68a is dispensed with and winding 57 is connected in its place, but through a suitable choke coil 147, the latter passing direct current therethrough but preventing alternating current energy supplied to the winding 57 from passing into the circuit supplying that winding with direct current. Alternating current energy is supplied to winding 57 preferably by a transformer 148 interposed between the winding and its supply and control circuit, a condenser 149 being interposed at a suitable point to permit alternating current to flow through it to the winding 57 but to block the flow of direct current energy into the transformer circuit. The indicating instrument in the form of a voltmeter 123 to indicate the alternating current energization of winding 57 is mounted as above noted on the panel 109 (Figure 4) and is connected across winding 57 but through a condenser 150 that blocks the flow of direct current energy to that instrument.

Thus, when the direct current is cut off from winding 57, as by setting to the "off" position whichever of the rheostats 144c, 144d, 144e, 144f is to be made effective by the selector switch S⁶, no biasing action takes place. The amount of biasing action, when desired, is controllable, and also its direction, by the just-mentioned rheostats and the reversing switches 142ª, 142ᵇ, according to the position of the selector switch S⁶, in the same general way as was described in connection with Figure 10.

Thus, I am enabled to achieve wide flexibility of action or control and the many widely varying conditions met with in practice can be quickly and reliably taken care of. Moreover, it will be seen that I am enabled to make changes in the action of the system without interrupting continuity of camera action or photographing, due to the switch-over control above described, and thereby also I am enabled to achieve greater speed of motion picture production or photography and also with minimum risk of film spoilage. As noted above, in the preferred form of control, the circuit constants may be set up by way of one set of controls while another set of controls is actually operating in their respective circuits.

It will also be understood, however, that where conditions may require it, I am enabled to change the action of the lens system or of the diaphragm plates or both during the exposure of the motion picture film during any single scene or sequence; the various rheostats, when once initially set to suit the beginning of a scene or sequence may be manipulated to change the action of the apparatus according to changing requirements of the scene or sequence.

As earlier above noted, the various controls which are operable to set the constants of the various circuits are preferably calibrated in any suitable way and by appropriate legends, and in achieving these calibrations the photoelectric cell circuit may, of course, and preferably is employed to make certain that the lens action or the action of the diaphragm plates is within the desired range of relative movement of the parts, and the photo-cell circuits may be employed from time to time to check up the calibration.

Thus, I am enabled dependably to operate the lens system throughout any selected portion of its normal range of relative movement; throughout the latter constancy of size and registry of images corresponding to different planes of sharpness from a point near the camera to a point vastly remote from the camera are achieved but by selecting any portion of that range of movement, the objects or that portion of the scene within the planes of sharpness that correspond to the selected portion are brought into prominence on the ultimate film, as against objects or portions of the scene outside of the thus-selected planes of sharpness.

I may, however, cause such a biasing of the movable lens as will cause its stroke of oscillation to overstep the corresponding end of the normal range of relative movement and thus register on the film geometrically similar images of different sizes, thus achieving a so-called "softening" effect.

Nicety, as well as wide flexibility of control is achieved. For example, in Figures 10 and 11, if a reversal of biasing action has to be effected under circumstances which require moving the selector switches through an intermediate position, as, for example, in shifting from position "1" to position "3" and thereby passing over position "2," any effect upon the operating mechanism of the camera as might be caused by passing the selector switches through an intermediate contact position, like position "2" in the just assumed example, may be avoided by setting to the "off" position the rheostats that are in the circuits corresponding to the selector switch position passed over; in that way, any chance of the transition, even though the latter is accomplished very rapidly, being accompanied by an undesired effect, may be avoided. Or, for purposes of such a transition, and just prior to effecting the transition, the controls or rheostats in the circuits of the position to be passed over may be set to duplicate the conditions set by the corresponding controls in the circuit position from which the transition is to take place; the circuit and operating conditions thus established, for example, for position "2," in Figures 10 and 11, to be passed over and moving from position "1" to position "3" may thus be made to be the same as theretofore existed at position "1."

It might be noted that the selection of frequency of oscillation is of great advantage. In motion picture photography, for example, the frequency or rate of exposure of film frames is usually about twenty-four frames per second; I prefer to employ in such case a frequency not less than that and preferably higher so as to insure that the relative lens movement passes through at least one complete cycle for each frame exposure, thus to record on the film the registering in-focus and out-of-focus images throughout the selected range of focus change. If it is desired to synchronize lens or diaphragm movement or both with frame exposure, the frequency changer 117 may be controlled or set to change the frequency of the system to match, or become a multiple of, the frequency of frame exposure. Preferably, the frequency of oscillation is comparatively high for I have discovered that I am enabled to materially, if not entirely, avoid so-called halation, caused, as is known, by reflection or refraction of light on or within the film itself. In thus making the relative movement take place at a frequency of oscillation greater than the frequency of frame exposure, the effect is to "eclipse" at high frequency the images projected upon the exposed camera element or film, bearing in mind that, as the lens system shifts the focus from one plane of sharpness to another, light from the object or points within that one plane of sharpness is, in effect, cut off, and light coming from the object or points in another plane of sharpness is what is directed onto the film. The higher the frequency of this eclipsing action, the less dense will be the light striking the film per cycle of the frequency of eclipsing.

The selectable frequency may be of substantial magnitude, approaching audio frequency, for example, and due to the above-mentioned effects the image recording is sharper than where lower frequencies are employed; accordingly, it is also possible to vary the sharpness of recording by varying the frequency of oscillation of the lens and the operator may, by such a control as above described, vary the frequency during operation of the camera or speedily and quickly prepare for subsequent changes as might be required to suit the technique, style or artistry desired.

Thus, it will be seen that there has been provided in this invention a photographic method and apparatus in which the various objects hereinbefore noted, together with many thoroughly practical advantages, are successfully achieved. It will be noted that precision of control and action are easily achievable and that a wide range of flexibility or change of selection of action has been made possible; furthermore, it will be seen that the method and apparatus are well adapted to meet the widely varying conditions of practical use.

As many possible embodiments may be made of the mechanical and electrical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, means for effecting movement of said movable means in recurring cycles within said certain range, a plurality of control means for said movement-effecting means, a selector capable of being set to determine which of said control means is to be currently effective to thereby permit setting of an ineffective control means to be subsequently made effective by actuation of said selector.

2. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, electromagnetic means including at least one energizable winding for effecting movement of said movable means in recurring cycles, a source of energy for said winding, a plurality of controls in circuit between said source and said winding and a selector switch for selectively making any one control means effective.

3. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, two electromagnetic means having energizable windings, a source of direct current for energizing one of said windings, a source of periodically varying current for energizing the other, a plurality of control means for controlling the energization of at least one of said windings and manually operable means for determining at will which of said plurality of control means is currently effective whereby an ineffective control means may be set or adjusted during effectiveness of the other.

4. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, a source of periodically varying electromotive force, electromagnetic winding means energized therefrom and producing a periodically varying magnetic field, there being a means producing a unidirectional field with which said varying field reacts, thereby effecting periodic movement of said electromagnetic means, thereby to actuate said movable means to oscillate the movable lens, electromagnetic means comprising a source of unidirectional energy for energizing said winding to cause it to produce a unidirectional magnetic field to react with said first-mentioned unidirectional field, thereby to change the stroke of oscillation of said movable lens and shift it in a direction toward one end of said certain range of relative movement.

5. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, means connected to said movable means for effecting movement thereof in recurring cycles and within said certain range, a plurality of control means therefor for varying the action and for varying the stroke of said movable means, electromagnetic means reversible in action for biasing the action of said movement-effecting means toward one end of said certain range of relative movement or the other in accordance with the direction of energization of said electromagnetic means, reversing switch means for reversing the energization of said electromagnetic means, a plurality of control means for varying the degree of energization thereof, there being a plurality for each direction of current flow as determined by said reversing switch means, a manually controlled selector for selecting which of said first-mentioned control means is to be currently effective, and means for actuating said reversing switch means synchronously with said selector, and a selector switch synchronously operative with said selector for determining which of said second-mentioned plurality of control means is to be effective.

6. An apparatus of the character described, in which there is a lens system having a plurality of lenses between which relative axial movement may take place and which are corrected to produce, at the image plane of said system and for a certain range of said relative movement, equality of size and registry of in-focus and out of focus images of a scene or object corresponding to a plurality of different planes of sharpness, means mounting said lenses in axial alinement and including movable means capable upon actuation of effecting relative axial movement between said lenses, actuating means for effecting movement of said movable means in recurring cycles throughout said certain range, a plurality of control means for varying the action thereof, reversible means acting upon said actuating means to restrict movement of said movable means toward one or the other end of said certain range, a plurality of control means for said last-mentioned means for varying its action and including means for reversing its action, and selector means operative upon said controlling and reversing means to make at least two of each of said plurality of control means selectable for each direction of action as determined by said reversing means.

7. An apparatus of the character described, in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, means energizable by alternating current energy for actuating said movable means in recurring cycles at the frequency of said energy, a source of alternating current energy having a plurality of control means therefor for changing the frequency of its output, a plurality of control means for varying the energization of said electromagnetic means, and selector switch means for determining which of said first plurality of control means and which of said second plurality of control means is effective at one time, thereby to permit ineffective control means thereof to be set or adjusted to be subsequently made effective by said selector means.

8. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, and means for actuating said movable means, said actuating means comprising means producing a unidirectional magnetic field, a winding mechanically connected to said movable means and positioned so that its magnetic field reacts with said first-mentioned magnetic field, a source of periodically varying electromotive force for energizing said winding to cause the latter to produce a varying magnetic field reacting with said unidirectional field to effect oscillation of said winding and said movable means by the reaction between said two fields, a source of unidirectional electromotive force, and means energized by the latter and mechanically connected to said movable means for producing a unidirectional magnetic field to coact with said first-mentioned unidirectional magnetic field to thereby affect the stroke of oscillation of said movable means.

9. An apparatus as claimed in claim 8 in which the means energized from said source of unidirectional electromotive force comprises a winding adjacent said first-mentioned winding and thereby positioned so that its unidirectional magnetic field coacts with said first-mentioned unidirectional field.

10. An apparatus as claimed in claim 8 in which the means energized from said source of unidirectional electromotive force comprises said first-mentioned winding.

11. An apparatus as claimed in claim 8 in which the means energized from said source of unidirectional electromotive force comprises said first-mentioned winding, there being circuit connections between the latter and both said sources of electromotive force, said circuit connections including electro-responsive current-blocking means for preventing the energy from one of said sources from reacting upon the other source.

12. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, means connected to said movable means for effecting movement thereof in recurring cycles and within said certain range, a plurality of control means therefor for varying the action and for varying the stroke of said movable means, electromagnetic means reversible in action for biasing the action of said movement-effecting means toward one end of said certain range of relative movement or the other in accordance with the direction of energization of said electromagnetic means, reversing switch means for reversing the energization of said electromagnetic means and having two positions, one for each direction of energization, and means allocating said plurality of control means into two groups, one group for each position of said reversing switch means.

13. An apparatus as claimed in claim 12 in which said control means are electro-responsive devices individually operable, a selector switch substantially synchronized with said reversing switch means for determining which of said devices is at any time to be effective, said reversing switch means and selector switch being constructed so that said selector switch may be actuated to select one of several of said devices for each effective position of said reversing switch means.

14. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, actuating means for said movable means having a plurality of control means therefor, movable diaphragm means for controlling the light passing through said lens system to the image plane, actuating means for effecting movement of said diaphragm means and having a plurality of control means therefor, and selector means for determining which of each of said plurality of control means is to be currently effective to thereby permit setting of ineffective control means to be subsequently made effective upon actuation of said selector means.

15. An apparatus as claimed in claim 14 in which said movable diaphragm means is in the form of an iris diaphragm and the actuating means therefor is in the form of a servo-motor, said second-mentioned plurality of control means being in the form of electrical devices each capable of affecting the energization of said motor.

16. An apparatus as claimed in claim 14 in which said movable diaphragm means is in the form of a plurality of movable plate members whose edges outline the aperture and said actuating means comprises an actuating device for each of said plate members, there being means causing said actuating devices to operate synchronously, said second-mentioned plurality of control means being each capable of controlling the action of all of said actuating devices.

17. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, actuating means for said movable means for effecting oscillation thereof at any one of several frequencies, a plurality of control means each capable of affecting the frequency at which said actuating means oscillates said movable means, and selector means for determining which of said plurality of control means is currently effective, thereby to permit setting of an ineffective control means to be subsequently made effective by said selector means.

18. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, actuating means for oscillating said movable means including a plurality of control means therefor in two groups whereby the frequency of oscillation of said movable means may be selected, reversible means acting upon said actuating means to restrict the oscillation of said movable means toward one or the other and of said certain range of relative movement, said reversible means having a control device movable into either of two positions according to the direction in which said reversible means is to act, and means allocating said plurality of control means in two groups, one group for each direction in which said control member is moved, whereby for each direction in which said reversible means acts one group of control means is available.

19. An apparatus of the character described in which there is a lens system having a plurality of lenses between which relative axial movement may take place and which are corrected to produce, at the image plane of said system and for a certain range of said relative movement, equality of size and registry of in-focus and out-of-focus images of a scene or object corresponding to a plurality of different planes of sharpness, means mounting said lenses in axial alinement and including movable means capable upon actuation of effecting relative axial movement between said lenses, means energizable by a periodically varying electromotive force for oscillating said movable means at a frequency that is a function of the periodicity of said electromotive force, reversible electromagnetic means for acting upon said movable means to bias its oscillation toward one or the other end of said range of relative movement according to the direction in which it acts, a reverse control for said reversible electromagnetic means, and two groups of selectable control means for changing the periodicity of energization of said oscillating means, one group for each direction in which said reverse control makes said reversible electromagnetic means effective.

20. An apparatus as claimed in claim 1 in which there is reversible means for shifting the actual relative movement toward one end or the other of said range, and a control for said reversible means.

PHILIP STANLEY SMITH.